(12) United States Patent
Bode et al.

(10) Patent No.: US 12,502,841 B2
(45) Date of Patent: Dec. 23, 2025

(54) PROCESSING ELEMENT COMPRISING A STRUCTURAL ELEMENT

(71) Applicant: Herrmann Ultraschalltechnik Gmbh & Co. KG, Karlsbad (DE)

(72) Inventors: Robin Alexander Bode, Pforzheim (DE); Raquel Roussel-Garcia, Pforzheim (DE); Timo Zink, Karlsruhe (DE)

(73) Assignee: HERRMANN ULTRASCHALLTECHNIK GMBH & CO. KG, Karlsbad (DE)

( * ) Notice: Subject to any disclaimer, the term of this patent is extended or adjusted under 35 U.S.C. 154(b) by 254 days.

(21) Appl. No.: 18/206,176

(22) PCT Filed: Dec. 7, 2021

(86) PCT No.: PCT/EP2021/084609
§ 371 (c)(1),
(2) Date: Jun. 6, 2023

(87) PCT Pub. No.: WO2022/122736
PCT Pub. Date: Jun. 16, 2022

(65) Prior Publication Data
US 2024/0416592 A1 Dec. 19, 2024

(30) Foreign Application Priority Data
Dec. 7, 2020 (DE) ...................... 10 2020 132 522.3

(51) Int. Cl.
*B29C 65/08* (2006.01)
*B29C 65/00* (2006.01)
(Continued)

(52) U.S. Cl.
CPC .......... *B29C 65/086* (2013.01); *B29C 65/085* (2013.01); *B29C 66/433* (2013.01);
(Continued)

(58) Field of Classification Search
CPC .......... A61F 13/15577; A61F 13/15585; A61F 13/15593; A61F 13/15601;
(Continued)

(56) References Cited

U.S. PATENT DOCUMENTS 3,756,880 A 9/1973 Graczyk
4,404,052 A * 9/1983 Persson ............... B32B 38/0008
156/580.2
(Continued)

FOREIGN PATENT DOCUMENTS

CN 107107115 A 8/2017
DE 2154057 A1 5/1972
(Continued)

OTHER PUBLICATIONS

European Patent Office, Application No. 21 836 062.6, Office Action Dated: Oct. 28, 2024, (in German).
(Continued)

*Primary Examiner* — Michael A Tolin
(74) *Attorney, Agent, or Firm* — PAUL & PAUL

(57) ABSTRACT

The present invention relates to a processing element for processing a material, such as, e.g. a sonotrode or an anvil, having a substantially cylindrical or cylinder-segment-shaped carrier surface which is intended to come into contact with the material during processing, the processing element being provided to be rotated about its longitudinal axis during processing, so that the carrier surface moves in a circumferential direction and rolls on the material to be processed, wherein at least one structural element is arranged on the carrier surface, which structural element protrudes in a radial direction beyond the carrier surface, wherein the structural element has a top surface which is intended to come into contact with the material to be processed. In order to provide a processing element enabling (Continued)

reliable welding at a higher feed rate, it is proposed according to the invention that the top surface comprises a base section and at least one recess section having a smaller distance from the longitudinal axis than the base section, wherein in a sectional view perpendicularly to the longitudinal axis, the base section and the recess section are arranged next to one another.

18 Claims, 7 Drawing Sheets

(51) Int. Cl.
*A61F 13/15* (2006.01)
*B29L 31/48* (2006.01)

(52) U.S. Cl.
CPC .............. *B29C 66/7294* (2013.01); *A61F 2013/15869* (2013.01); *B29L 2031/4878* (2013.01)

(58) Field of Classification Search
CPC .. A61F 2013/15821; A61F 2013/15861; A61F 2013/15869; B29C 65/08; B29C 65/083; B29C 65/085; B29C 65/086; B29C 65/087; B29C 66/1122; B29C 66/232; B29C 66/32; B29C 66/326; B29C 66/328; B29C 66/3282; B29C 66/43; B29C 66/433; B29C 66/7294; B29C 66/73921; B29C 66/81413; B29C 66/81415; B29C 66/81419; B29C 66/81421; B29C 66/81422; B29C 66/81423; B29C 66/81433; B29C 66/81435; B29C 66/83413; B29C 66/83511; B29C 66/8432; B29L 2031/4878; B32B 2555/02
See application file for complete search history.

(56) References Cited

U.S. PATENT DOCUMENTS

| | | | |
|---|---|---|---|
| 5,840,154 | A | 11/1998 | Wittmaier |
| 9,138,937 | B2 | 9/2015 | Frank et al. |
| 10,040,243 | B2 | 8/2018 | Vogler |
| 2010/0243172 | A1 | 9/2010 | Blanchard et al. |
| 2017/0266872 | A1* | 9/2017 | Vogler ................... B23K 20/10 |
| 2018/0093444 | A1* | 4/2018 | Begrow ................... B32B 5/22 |
| 2021/0154943 | A1 | 5/2021 | Scholz |

FOREIGN PATENT DOCUMENTS

| | | | |
|---|---|---|---|
| DE | 2833577 | A1 | 2/1980 |
| DE | 102014115538 | A1 | 4/2016 |
| DE | 102017119273 | A1 | 2/2019 |
| EP | 0736356 | A1 | 10/1996 |
| EP | 0531666 | B1 | 1/1999 |
| EP | 1477293 | A2 | 11/2004 |
| EP | 2063842 | | 6/2009 |
| EP | 3094468 | | 11/2016 |
| EP | 3209433 | | 8/2017 |
| GB | 2257652 | A | 1/1993 |
| JP | 2019536659 | A | 12/2019 |
| WO | 2015107484 | A1 | 7/2015 |
| WO | 2018064340 | A1 | 4/2018 |
| WO | 2022097455 | A1 | 5/2022 |

OTHER PUBLICATIONS

Christian Tischler, The International Bureau of the World Intellectual Property Organization, International Preliminary Report on Patentability, Report Dated: Mar. 15, 2023, PCT/EP2021/084609 (English translation).

Office Action, Mailing Date: Apr. 22, 2025, Japan Patent Office, Japanese Application No. 2023-534131 (and English Translation of Office Action).

Office Action, Dated Aug. 20, 2025, Chinese Application No. 107107115A, Examination Department: Tianjin Center for Patent Examination Cooperation.

* cited by examiner

PROCESSING ELEMENT COMPRISING A STRUCTURAL ELEMENT

CROSS-REFERENCE TO RELATED APPLICATIONS

This application is a national phase application of International Application PCT/EP2021/084609, filed Dec. 7, 2021, which claims the priority of German Patent Application 10 2020 132 522.3, filed Dec. 7, 2020, both of which are incorporated herein in their entireties by reference.

The present invention relates to a processing element for ultrasonic processing of a material, such as a sonotrode or an anvil. A corresponding processing element is described, for example, in EP 3 209 433 B1.

Ultrasound is increasingly being used for joining nonwoven materials. Two sections of nonwoven material to be joined together are placed one above the other in a gap between a sonotrode and an anvil and the sonotrode is subjected to ultrasonic vibration. Due to the friction induced by the ultrasonic vibration, a point heating occurs at the contact surfaces lying on top of each other, so that in particular thermoplastic components of the nonwoven fabric are melted. The melted components of the material sections to be joined flow into each other and ensure a firm bond after cooling.

In this way, it is possible to join corresponding sections of nonwoven material together to form a side seam when manufacturing nappies.

When processing nonwovens, it is often desirable to gather the material. For this purpose, additional elastic threads are inserted between the nonwoven sections to be joined. The nonwoven sections to be joined are then connected to each other at at least two connecting surfaces, whereby a thread is fixed between the two connecting surfaces during processing by means of ultrasound in such a way that there is a positive connection between the thread and the nonwoven sections in two spatial directions which are oriented perpendicular to each other. In this way, a gathering of the material can be achieved.

The processing element may have a substantially cylindrical or cylinder-segment-shaped carrier surface that is designed to come into contact with the material during processing. The processing element is then rotated around its longitudinal axis during processing so that the carrier surface rolls on the material to be machined.

In this case, the processing element can have an essentially cylindrical or cylinder-segment-shaped carrier surface which is intended to come into contact with the material during processing. The actual welding then takes place in the area between the top surface of the structural element and a sealing surface of a counter-element arranged at a distance from it.

In the case of thread anchoring, the elongated structural element typically extends along the longitudinal axis of the processing element so that the structural element is usually oriented at an angle, usually a right angle, to the orientation of the thread. The structural element therefore connects the thread in sections to the nonwoven fabric sections. Areas in which the thread is free to move alternate with sections in which the thread is connected to the nonwoven fabric sections. This connection can be achieved either by a force-fit connection or by a material-fit connection between the nonwoven fabric and the thread in the spatial direction in which there is no form-fit connection. If the thread is stretched during ultrasonic processing, the thread is fixed in sections, which results in a gathering of the nonwoven fabric when the thread is relaxed after processing.

For example, the counter-element may be a sonotrode and the processing element may be an anvil. In the following, the invention is explained on the basis of this example, which is the preferred embodiment. In principle, however, it is possible to design the processing element as a sonotrode and the counter-element as an anvil.

During processing, the carrier surface with the structural elements rolls on the material to be processed, so that the structural elements in particular cause welding.

The processing speed is limited with the prior art devices.

In principle, the feed rate, i.e. the speed at which the material is moved through the gap between the processing element and the counter-element, can be increased.

However, the sonotrode, which acts on the material with a fixed frequency, will then no longer apply enough energy to the material to enable reliable welding. This is because at a higher feed rate, the material is in contact with the sealing surface of the sonotrode for a shorter period of time and therefore fewer "strokes" are applied to the material by the sonotrode.

This can be partially compensated by increasing the force with which the sonotrode is pressed onto the material to be processed. As a result, more energy is transferred into the material "per stroke" of the sonotrode. However, this causes more friction and leads to the fact that the melted components, which are formed by the ultrasonic processing at the interfaces between the material layers to be welded. i.e. in the so-called joining zone, are pressed out of the joining zone by the structural elements, which also leads to a poorer seam, since there are no longer enough thermoplastic components available in the joining zone. Alternatively or in combination, the vibration amplitude of the ultrasonic vibration could also be increased. This would also transfer more energy into the material "per stroke" of the sonotrode. However, this is only possible to a limited extent. If the sonotrode is operated with a too high vibration amplitude, the sonotrode material may be damaged.

In order to achieve a higher processing speed, so-called "welding wheels" have already been used, in which several sonotrodes are arranged on a wheel in order to increase the contact time during the rotation of the wheel. However, this solution is very complex.

If, in addition, threads are to be joined to the nonwovens, there is the additional problem that structural elements that are too narrow result in insufficient thread clamping, since the clamping force is reduced due to the small interaction surface, which corresponds to the top surface of the structural elements, with the nonwoven fabric sections. If, on the other hand, the structural element is chosen too wide, the interaction surface and thus the clamping force is greater, but the larger interaction surface also leads to increased friction with the material to be processed. Furthermore, if the structural elements are too wide, the free space in which the thread can move unhindered is reduced, which has a negative effect on the shirring properties of the material.

Based on the described prior art, it is therefore the problem of the present invention to specify a processing element with which reliable welding is made possible.

According to the invention, this problem is solved in that the top surface has a base section and at least one recess section which is at a smaller distance from the longitudinal axis than the base section, wherein, in a sectional view perpendicular to the longitudinal axis, the base section and recess section are arranged next to one another, wherein the recess formed by the recess section does not extend as far as the carrier surface.

When the structural element rolls on the material, plasticised components can be received in the recess section, so that the described pressing out of the plasticised components from the joining zone is reduced.

In the case of thread anchoring, the concentration of the melt in the recess section additionally improves thread clamping.

The recess section further leads to a reduction of the effective interaction surface and thus the friction with the material. At the same time, the structural element can be made wider so that the thread is sufficiently fixed. Furthermore, the recess section means that less force has to be applied between the processing element and the counter-element in order to achieve the same processing result. In addition, an improved feel of the resulting product has been observed.

In a preferred embodiment, the recess preferably has a depth of less than 1 mm and most preferably between 0.05 mm and 0.2 mm.

In a further preferred embodiment, the recess section is formed as a groove which is preferably not aligned solely in the circumferential direction. If the groove is aligned in the circumferential direction, the groove preferably does not fully circumvent the carrier surface, but extends only over a circumferential angle <360°, preferably over a circumferential angle of less than 45° and most preferably of less than 25°. It is also possible that several grooves are arranged at a distance from each other in the circumferential direction.

The groove is not intended to interrupt the welding, but merely to receive melted material so that it essentially remains in place and can serve to join the layers of material.

It has been shown that this groove can stop the detrimental delocalisation of the melt due to the increased pressure of the sonotrode on the material to be processed, at the location of the groove. The melt is then only moved up to the groove. The groove thus serves as a receptacle for the melt material.

In a preferred embodiment, the groove has a width that is less than 1 mm and preferably less than 0.6 mm. Preferably, the width of the groove is between 0.2 and 0.4 mm.

Depending on the material to be welded, it may be sufficient if the groove has a cross-sectional area of less than $0.15 \text{ mm}^2$. Preferably, the cross-sectional area is even less than $0.05 \text{ mm}^2$ and ideally the cross-sectional area is between $0.015 \text{ mm}^2$ and $0.04 \text{ mm}^2$.

In a preferred embodiment, the structural element has a plurality of grooves, preferably at least three grooves, in the top surface, which are not aligned in the circumferential direction, preferably the grooves being arranged parallel to each other. The grooves succeed in holding melted material at the respective position, therefore several grooves are advantageous.

In a further preferred embodiment, it is provided that the top surface of the structural element has a main section which is substantially flat or formed with a convex curvature having a radius of curvature corresponding to the distance of the main section from the cylinder axis, and at least one chamfer section adjoining the main section in the circumferential direction. The chamfer section is either angled with respect to the main section so that the main section and the chamfer section enclose an angle smaller than 180°, or the chamfer section is convexly curved, wherein, if the main section is convexly curved, the radius of curvature of the chamfer section is smaller than the radius of curvature of the main section. Preferably, the at least one recess section is arranged in the main section. The chamfer section serves to gradually prepare the material for welding contact between the main section and the counter-element. At the transition between the main section and the chamfer section, the pitch or curvature of the top surface changes. This ensures that when the processing element is used, the distance between the structural element and the counter-element continuously decreases until the smallest distance between the structural element and the counter-element has been realised.

In a further preferred embodiment, it is provided that the top surface has two chamfer sections adjoining the main section on opposite sides in the circumferential direction, which are angled relative to the main section, so that the main section and chamfer section each enclose an angle of less than 180°. During processing, the top surface of the structural element thus not only has an incoming chamfer section, but also an outgoing chamfer section, as a result of which, even at the end of the processing of the structural element, the force applied to the processing element by the counter-element is only gradually reduced.

In a further preferred embodiment, the top surface of the structural element has an elongated shape with a length l and a width b, where l>b. Preferably, the length does not extend parallel to the longitudinal axis, but preferably substantially perpendicular thereto.

In a further embodiment, the structural element as well as the recess section arranged in the top surface extend continuously over an entire length l of the processing element, the length l being oriented substantially parallel to the longitudinal axis. Preferably, the length l of the structural element is significantly greater than the width b of the structural element, which is arranged substantially perpendicular to the length l.

In a further embodiment, the structural element also extends substantially along the longitudinal axis of the processing element, wherein the structural element as well as the recess section arranged in the top surface extend in a serpentine shape. It is understood that in this case the base section is also serpentine.

The present invention also relates to an ultrasonic welding apparatus having a processing element as described above. This ultrasonic welding apparatus has, in addition to the processing element, a counter-element which has a sealing surface which can be arranged opposite the processing element, so that a gap is formed between the top surface of the structural element of the processing element and the sealing surface of the counter-element, in which gap a material to be processed can be arranged, wherein, in a sectional view perpendicular to the longitudinal axis of the processing element, the sealing surface has a welding section which is concavely curved at least in sections.

As already noted above, the counter-element can be a sonotrode and the processing element an anvil. The curvature of the welding section in sections increases the contact time between the sonotrode and the anvil so that more energy can be introduced into the material, which also increases the feed rate without having to increase the force with which the sonotrode is pressed onto the material to be processed.

In another preferred embodiment, it is provided that the radius of curvature of the concave curved section of the counter-element is approximately equal to the radius of curvature of the main section of the processing element. In fact, it is particularly preferred if the radius of curvature of the concave curved section of the counter-element is slightly larger than the radius of curvature of the main section of the processing element. In this case, the difference between the two radii of curvature corresponds to the width of the gap that remains between the sealing surface and the top surface of the structural element during welding processing.

In a further embodiment, the counter-element has grooves for at least partially receiving at least one thread, which grooves are oriented in a feed direction in which the material to be processed is moved through the gap between the processing element and the counter-element, the material to be processed comprising at least two material web sections and the at least one thread, the at least one thread being positioned between the two material web sections. In this way, the processing element according to the invention can also be used to produce gatherable materials in an ultrasonic processing apparatus.

In another preferred embodiment, the sealing surface has an inlet section which is located adjacent to the welding section and is either non-curved or is concavely curved with a radius of curvature which is larger than the radius of curvature of the welding section. Here too, at the transition between the inlet section and the welding section, the pitch or the curvature of the sealing surface changes, so that in the section of the inlet section the distance between the processing element and the counter-element becomes successively smaller until the smallest distance is reached, which corresponds to the distance between the welding section and the top surface of the structural element. This inlet section is arranged in such a way that a material moving through the gap in the feed direction first comes into contact with the inlet section and then with the welding section.

It is advantageous if the inlet section and the welding section are approximately the same size.

Further advantages, features and possible applications of the present invention will become apparent from the following description of a preferred embodiment and the accompanying figures.

Figure 1:
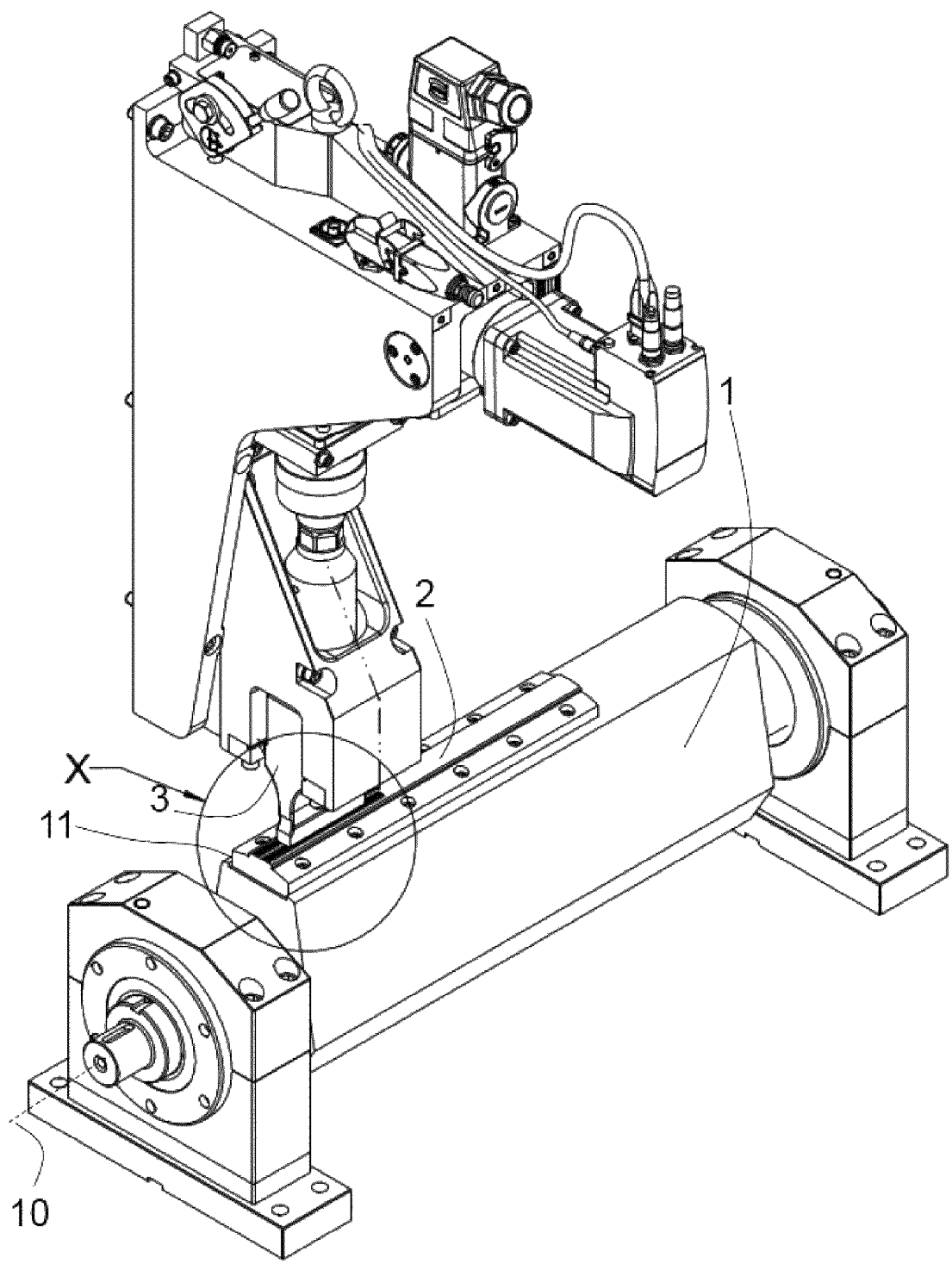
FIG. 1 shows a perspective view of an ultrasonic welding apparatus.

FIG. 1 shows a perspective view of an ultrasonic welding apparatus. The ultrasonic welding apparatus has a processing element 1 in the form of an anvil, which is designed here as a roller that can be rotated about a longitudinal axis 10. At least one transverse seam bar 11 with a carrier surface 2 is arranged on the roller. A counter-element 3 in the form of a sonotrode is arranged opposite.

The counter-element 3 can be excited here with an ultrasonic vibration. Material to be processed is then moved through between the carrier surface 2 and the sealing surface of the sonotrode 3 facing the carrier surface 2, whereby the speed of movement of the material corresponds to the peripheral speed of the processing element 1. The gap between the carrier surface 2 and the sonotrode 3 must be selected so that the ultrasonic vibration is transmitted to the material during processing and the thermoplastic components melt at the interfaces.

Figure 2:
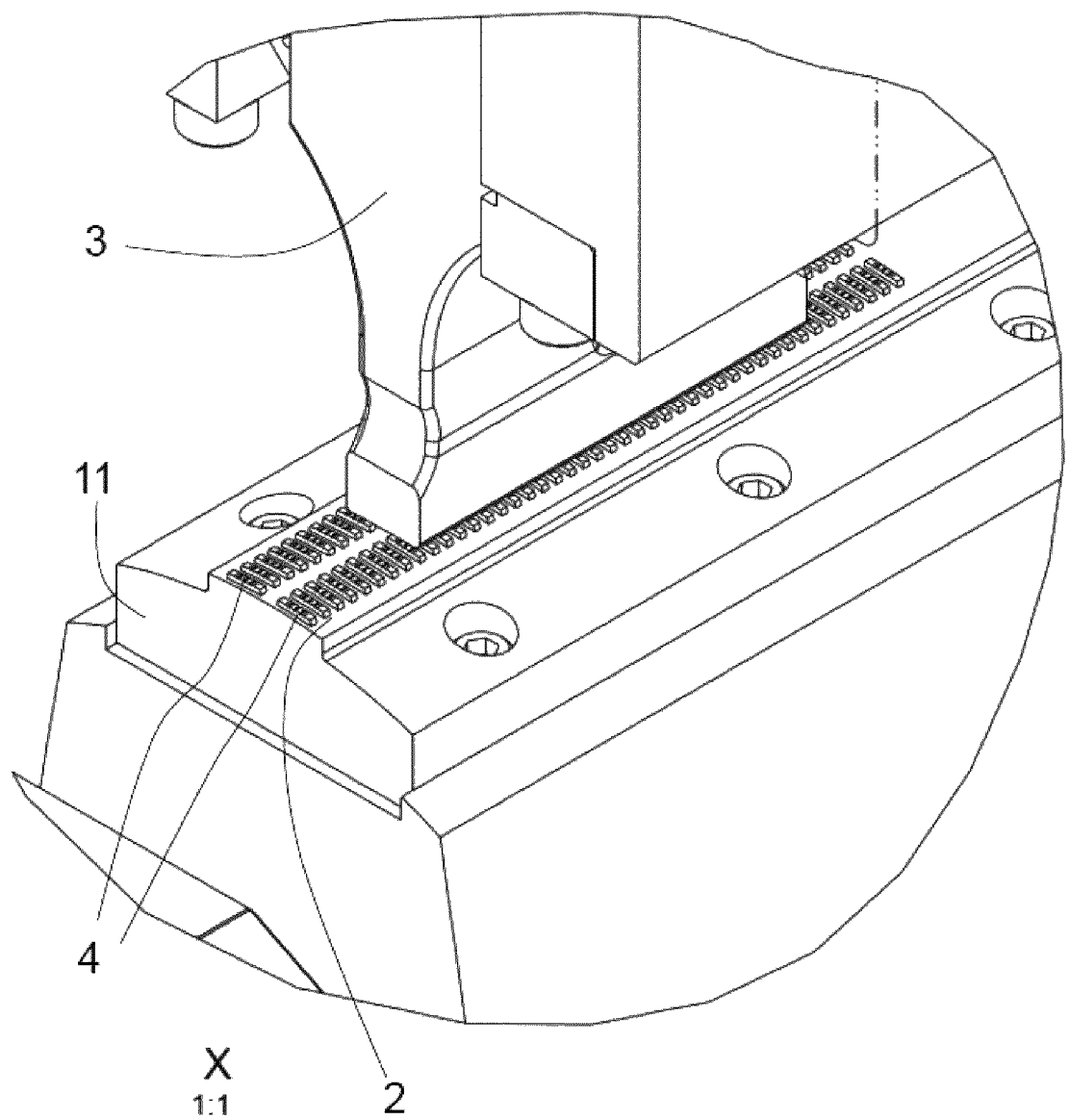
FIG. 2 shows a detailed enlargement of the section marked X in FIG. 1.

FIG. 2 shows a detailed enlargement of FIG. 1.

It can be seen that a plurality of structural elements 4 are arranged on the carrier surface 2. The structural elements 4 have an elongated shape, which are oriented in the circumferential direction. The structural elements 4 come into contact with the material during processing and determine the welding pattern that is introduced into the material during processing. The ultrasonic welding apparatus can be used, for example, to create side seams of nappies made of non-woven material.

Figure 3:
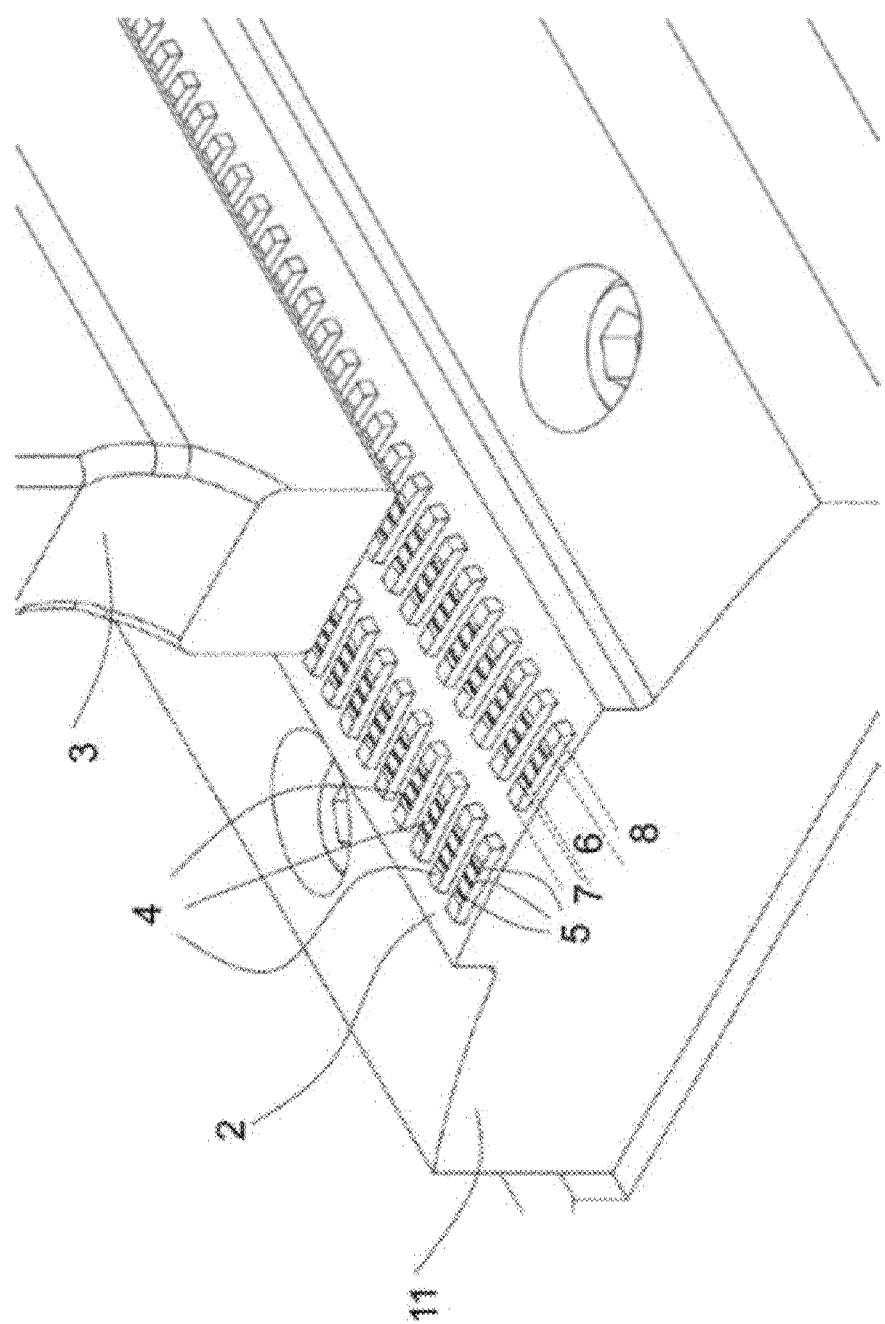
FIG. 3 shows a detailed enlargement of FIG. 2.

FIG. 3 shows a detailed enlargement of FIG. 2, in which the structural elements 4 are clearly visible. In the circumferential direction (in relation to the longitudinal axis 10), two structural elements 4 are arranged next to each other. In the axial direction, a number of such pairs of structural elements are arranged next to each other.

Each structural element has a main section 6 and two chamfer sections 7, 8 which are more curved than the main section 6. Grooves 5 have been introduced in the main section 6, which in the embodiment shown run perpendicular to the circumferential direction. It is not necessary that the grooves run perpendicular to the circumferential direction. However, in order to achieve the effect according to the invention, they should not be arranged parallel to the circumferential direction. If the grooves are arranged parallel to the circumferential direction, they should not extend over the entire structural element 4.

During welding, the structural elements 4 roll on the material to be processed so that the chamfer section 8 first comes into contact with the material to be processed. Due to the angled arrangement of the chamfer section 8, the distance between the structural element 4 and the opposite sealing surface of the counter-element 3 successively decreases in this area until the smallest distance is reached in the area of the main section 6. The main section 6 can be convexly curved, whereby the radius of curvature essentially corresponds to the distance between the top surface of the structural element 4 and the longitudinal axis 10 of the processing element 1.

Grooves 5 with a depth of 0.1 mm and a width of 0.3 mm have been introduced in the main section 6. Molten material can penetrate into the resulting recesses so that it essentially remains in place and is not squeezed out of the joining zone by the structural elements.

Figure 4:
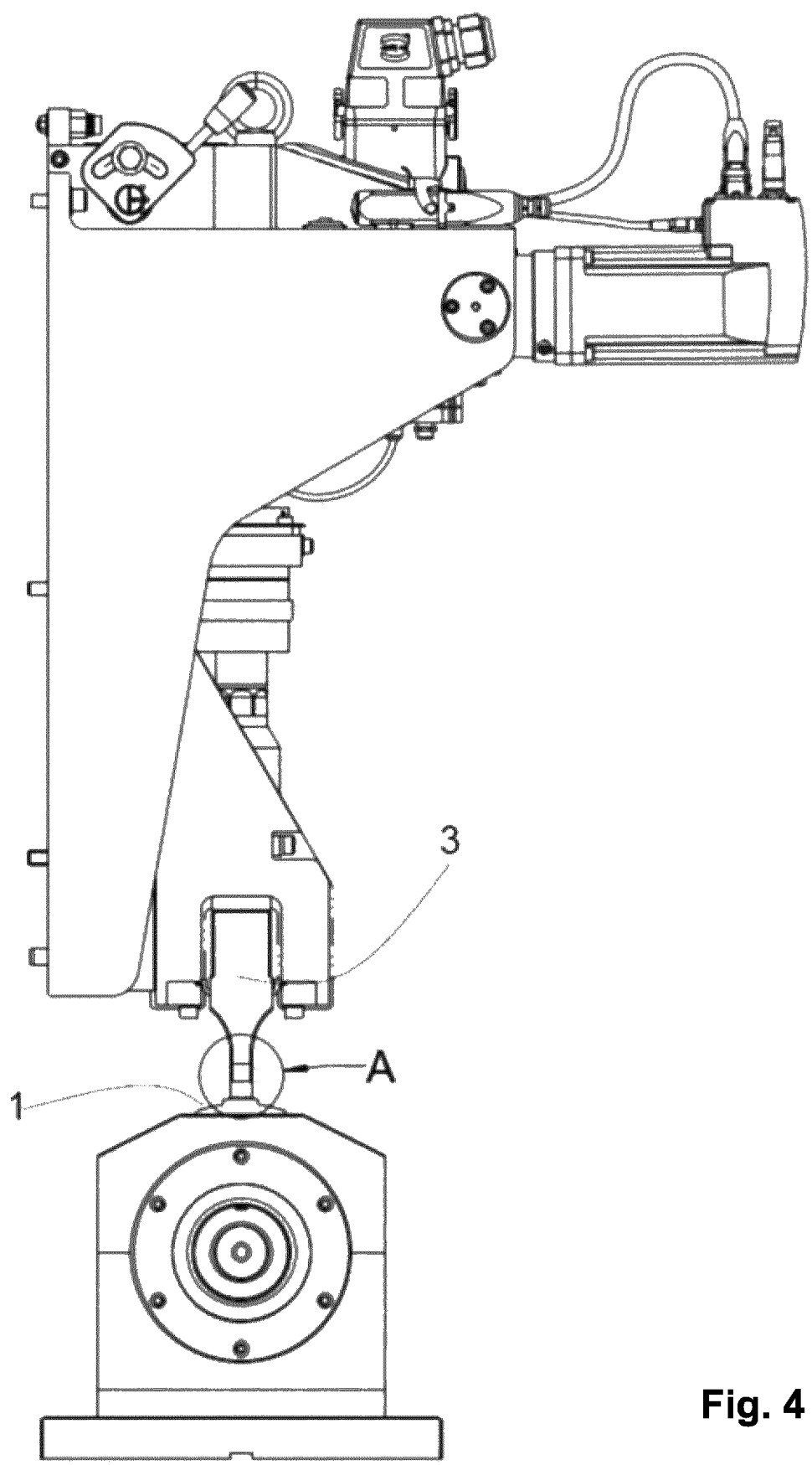
FIG. 4 shows a side view of the ultrasonic welding apparatus of FIG. 1.

FIG. 4 shows a side view of the ultrasonic welding apparatus of FIG. 1. The sealing surface, i.e. the surface facing the carrier surface or the structural elements 4, is surface 9.

Figure 5:
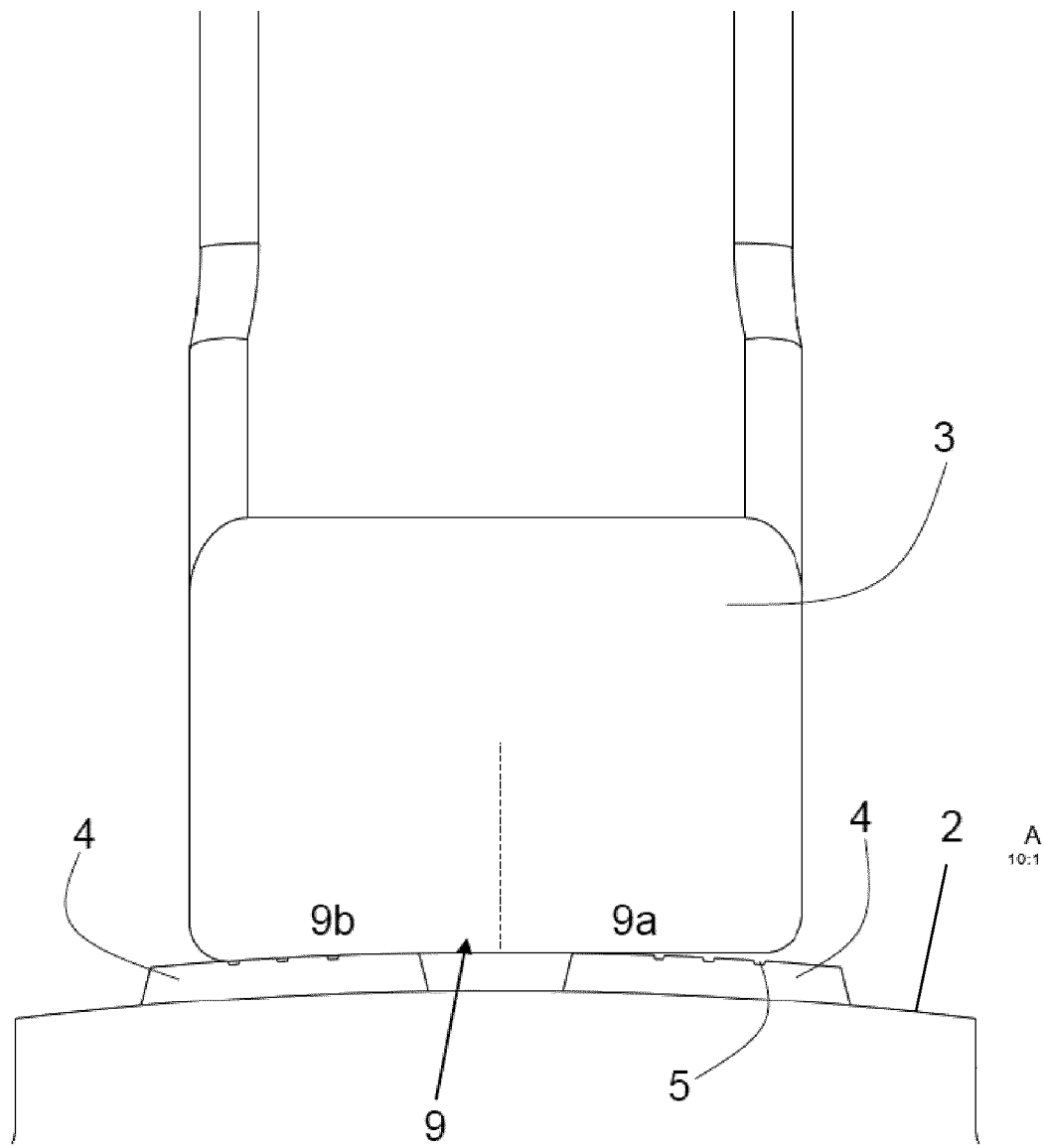
FIG. 5 shows an enlarged partial view of FIG. 4.

FIG. 5 shows an enlarged partial view of FIG. 4. The surface 9 here consists of an inlet section 9a and a welding section 9b. The welding section 9b is concavely curved with essentially the same radius of curvature as the radius of curvature of the main section of the processing element. This measure ensures that during processing the material remains in contact with the sonotrode for longer, so that more energy can be introduced into the material to be processed. In this embodiment, the inlet section 9a is not curved and thus ensures that the material to be processed is initially guided into a narrowing gap in the area of the inlet section 9a. In the area of the welding section 9b, the gap is then minimal and is kept essentially constant in the area of the welding section. In this case, the welding is mainly carried out by the welding section 9b, but the inlet section 9a can already contribute to the welding at its end facing the welding section 9b.

Figure 6:
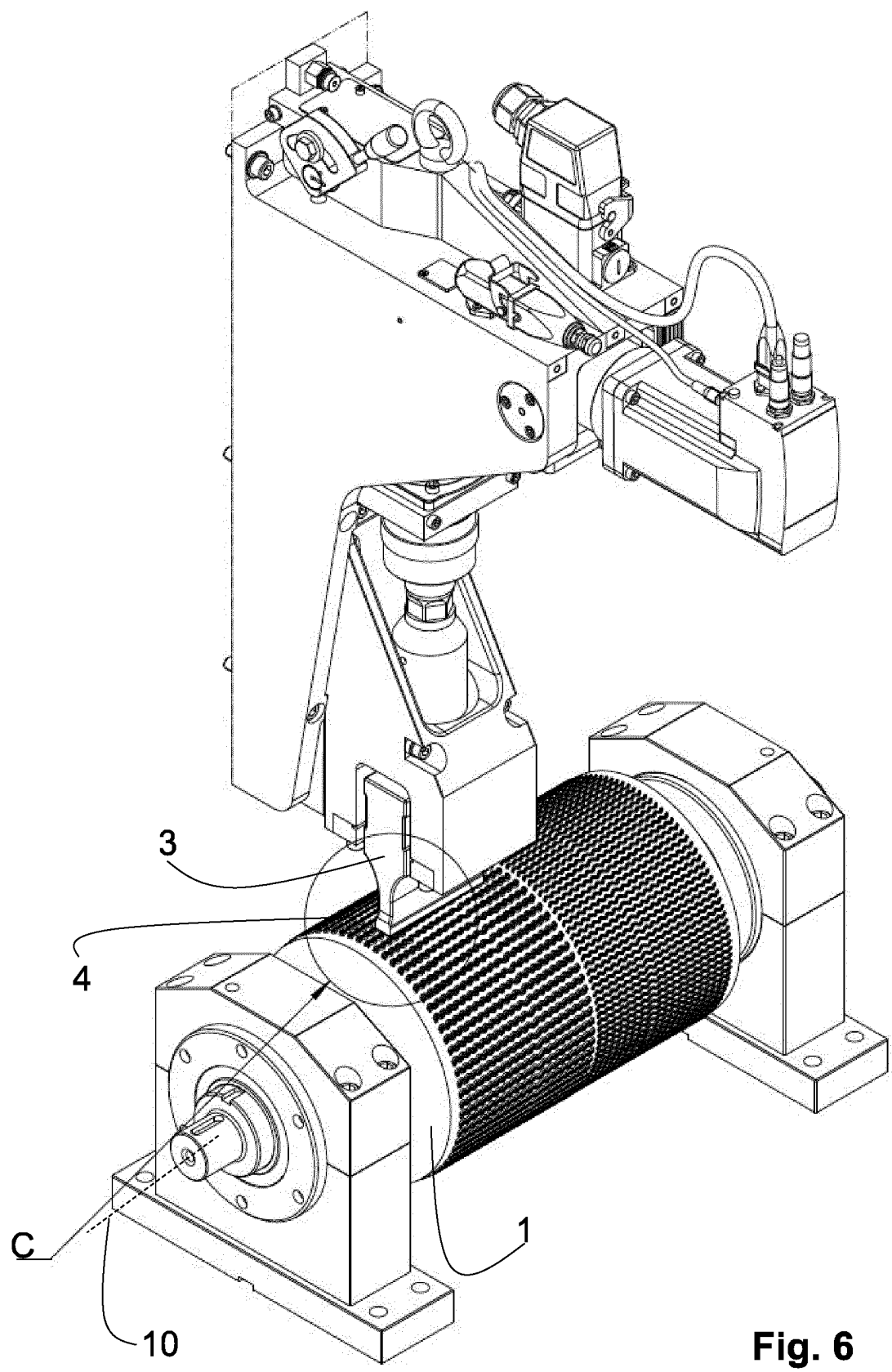
FIG. 6 shows a schematic representation of a further embodiment of the processing element according to the invention.
Figure 7:
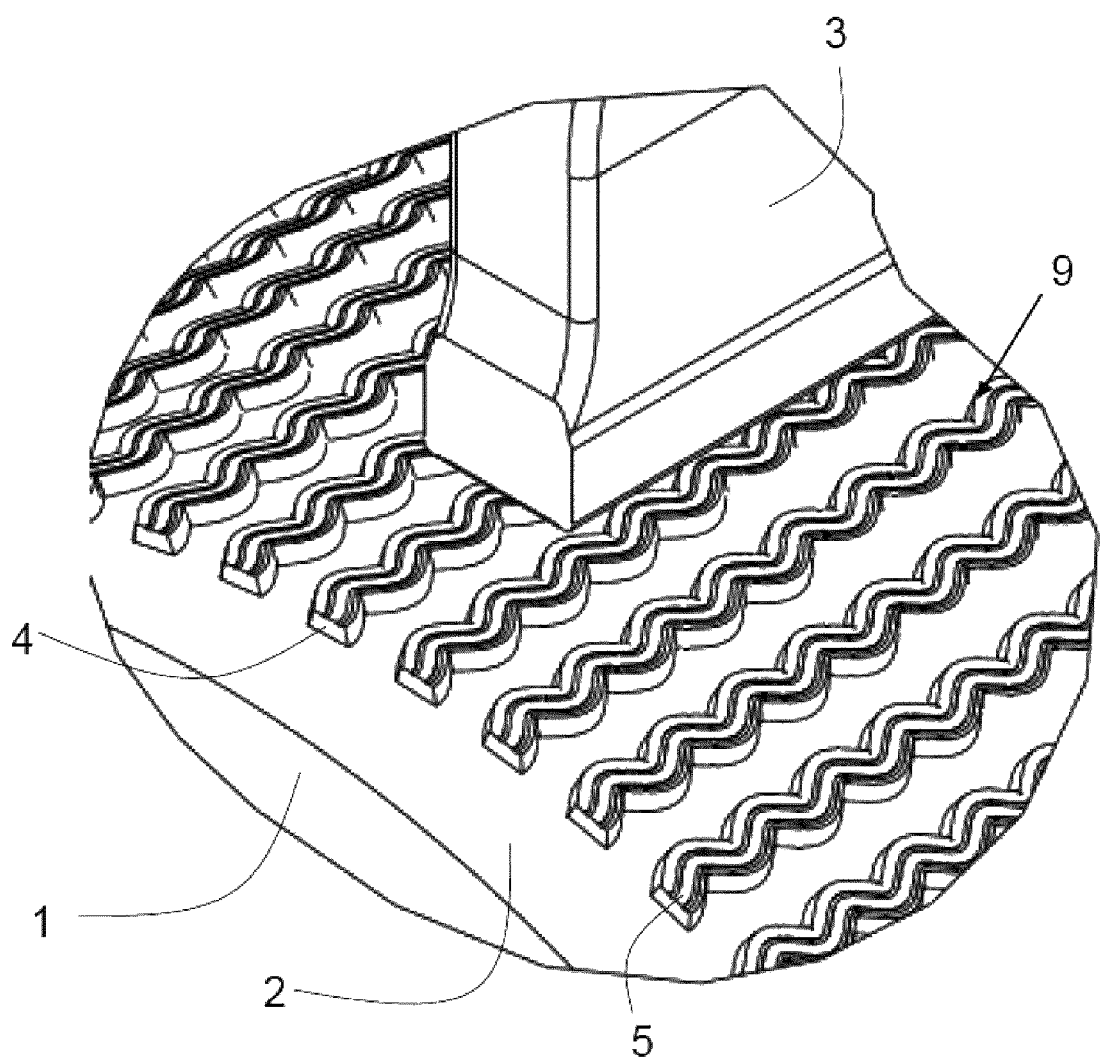
FIG. 7 shows an enlargement of the schematic representation in FIG. 6.

Finally, FIGS. 6 and 7 show an alternative embodiment of the processing element 1 according to the invention, which is particularly suitable for producing gatherable materials.

For this purpose, at least one thread is guided between two material web sections of the material to be processed, which is connected to the material web sections in sections by the structural elements 4 in a force-fitting or material-fitting manner. The structural elements 4 extend continuously over the entire extent of the anvil 1 in the direction of the longitudinal axis 10. Furthermore, the structural element 4 and thus also the grooves 5 run in a serpentine shape (see FIG. 7). Due to the design shown in FIGS. 6 and 7, the thread is stably connected to the material web sections, while at the same time the friction between the processing element 1 and the material is reduced.

LIST OF REFERENCE SIGNS

1 Processing element (anvil)
2 Carrier surface
3 Counter-element (sonotrode)
4 Structural elements
5 Grooves
6 Main section
7, 8 Chamfer sections
9 Sealing surface
9a Inlet section
9b Welding section
10 Longitudinal axis
11 Seam selvage

The invention claimed is:

1. A processing element (1) for processing a material comprising a substantially cylindrical or cylinder-segment-shaped carrier surface (2) which is intended to come into contact with the material during processing,
the processing element (1) being intended to be rotated about a longitudinal axis thereof during processing so that the carrier surface (2) moves in a circumferential direction and rolls on the material to be processed,
at least one structural element (4) each being arranged on the carrier surface (2), projecting in a radial direction above the carrier surface (2), each of the at least one structural element (4) having an upper side having an upper surface intended to come into contact with the material to be processed,
the upper side having a base section and at least one recess section (5) which is at a smaller distance from the longitudinal axis (10) than the base section, wherein in a sectional view perpendicular to the longitudinal axis (10) the base section and the at least one recess section (5) are arranged next to one another, wherein at least one respective recess formed by the at least one recess section (5) does not extend as far as the carrier surface (2).

2. The processing element (1) according to claim 1, characterised in that the at least one recess has a depth of less than 1 mm.

3. The processing element (1) according to claim 1, characterised in that the at least one recess section is formed as a groove (5).

4. The processing element (1) according to claim 3, characterised in that the groove (5) has a width which is smaller than 1 mm.

5. The processing element (1) according to claim 3, characterized in that the groove (5) has a cross-sectional area of less than 0.15 mm$^2$.

6. The processing element (1) according to claim 1, characterised in that the each of at least one structural element (4) has a plurality of grooves (5) in the upper surface which are not circumferentially aligned.

7. The processing element (1) according to claim 1, characterized in that
the upper surface comprises a main section (6) which is formed substantially flat or with a convex curvature with a radius of curvature corresponding to the distance of the main section (6) from the longitudinal axis, and
at least one chamfer section (7,8) adjoining the main section in the circumferential direction, which at least one chamfer section (7,8) is either angled with respect to the main section (6) so that the main section and the chamfer section (6,7,8) form an angle <180°, and/or is convexly curved,
wherein, if the main section (6) is convexly curved, the radius of curvature of the at least one chamfer section (7,8) is smaller than the radius of curvature of the main section (6).

8. The processing element (1) according to claim 1, characterised in that at least two structural elements spaced apart from one another in the circumferential direction are provided.

9. The processing element (1) according to claim 1, characterised in that the processing element (1) is designed as an anvil.

10. The processing element (1) according to claim 1, characterised in that the upper surface has an elongate shape with a length l and a width b, where l>b.

11. The processing element (1) according to claim 1, wherein the at least one structural element (4) as well as the at least one recess section (5) arranged on the upper surface extend continuously over an overall length l of the processing element (1), wherein the length l is substantially oriented parallel to the longitudinal axis (10).

12. An ultrasonic welding apparatus comprising a processing element (1) according to claim 7 and a counter-element, the counter-element (3) having a sealing surface (9) which can be arranged opposite the processing element (1) so that a gap is formed between the upper surface and the sealing surface (9) in which a material to be processed can be arranged, wherein, in a sectional view perpendicular to the longitudinal axis of the processing element (1), the sealing surface (9) has a welding section (9b) which is concavely curved at least in sections, the concavely curved sections having a radius of curvature.

13. The ultrasonic welding apparatus according to claim 12, characterised in that the radius of curvature of the concavely curved sections of the counter-element (3) corresponds approximately to the radius of curvature of the main section (6) of the processing element (1).

14. The ultrasonic welding apparatus according to claim 12, wherein the counter-element (3) comprises grooves for at least partially receiving at least one thread, which grooves are oriented in a feed direction in which the material to be processed is moved through the gap between the processing element (1) and the counter-element (3), wherein the material to be processed consists of at least two material web sections and the at least one thread, wherein the at least one thread is positioned between the at least two material web sections.

15. The ultrasonic welding apparatus according to claim 14, characterised in that the processing element (1) is intended to be rotated in the feed direction in which the material to be processed is passed between the processing element (1) and the counter-element (3), wherein an inlet section (9a) and the welding section (9b) are arranged such that a material moved in the feed direction through the gap comes into contact first with the inlet section (9a) and then with the welding section (9b).

16. The ultrasonic welding apparatus according to claim 14, characterized in that an inlet section (9*a*) and the welding section (9*b*) are approximately equal in size.

17. The ultrasonic welding apparatus according to claim 12, characterised in that the sealing surface (9) has an inlet section (9*a*) which is located adjacent to the welding section (9*b*) and is either non-curved or concavely curved with a radius of curvature which is larger than the radius of curvature of the welding section (9*b*).

18. The ultrasonic welding apparatus according to claim 12, characterised in that the counter-element (3) is designed as a sonotrode.

* * * * *